United States Patent [19]
Klein et al.

[11] Patent Number: 5,671,439
[45] Date of Patent: Sep. 23, 1997

[54] MULTI-DRIVE VIRTUAL MASS STORAGE DEVICE AND METHOD OF OPERATING SAME

[75] Inventors: Dean A. Klein, Lake City, Minn.; Eric D. Anderson, Hudson, Wis.

[73] Assignee: Micron Electronics, Inc., Minneapolis, Minn.

[21] Appl. No.: 370,650

[22] Filed: Jan. 10, 1995

[51] Int. Cl.⁶ ............................................. G06F 12/06
[52] U.S. Cl. .................. 395/821; 395/841; 395/405; 395/441
[58] Field of Search ......................... 360/22, 23, 24; 365/230.04; 369/34; 395/821, 841, 405, 441, 454, 440, 850

[56] References Cited

U.S. PATENT DOCUMENTS

| | | | |
|---|---|---|---|
| 4,222,078 | 9/1980 | Bock | 360/23 |
| 4,366,510 | 12/1982 | Watanabe et al. | 360/22 |
| 4,393,444 | 7/1983 | Weinberg | 395/405 |
| 4,622,598 | 11/1986 | Doi et al. | 360/22 |
| 5,047,873 | 9/1991 | Ballinger et al. | 360/22 |
| 5,088,081 | 2/1992 | Farr | 360/24 |
| 5,148,432 | 9/1992 | Gordon et al. | 395/182.05 |
| 5,237,466 | 8/1993 | Glaser et al. | 360/73.03 |
| 5,276,808 | 1/1994 | Cheney et al. | 395/841 |
| 5,301,297 | 4/1994 | Menon et al. | 395/441 |
| 5,355,486 | 10/1994 | Cornaby | 395/650 |
| 5,359,611 | 10/1994 | Parks et al. | 371/40.4 |
| 5,367,410 | 11/1994 | McCarthy | 360/22 |
| 5,388,108 | 2/1995 | De Moss et al. | 371/51.1 |
| 5,402,428 | 3/1995 | Kakuta et al. | 395/182.07 |
| 5,404,454 | 4/1995 | Parks | 395/841 |
| 5,440,716 | 8/1995 | Schultz et al. | 395/441 |
| 5,446,855 | 8/1995 | Dang et al. | 395/401 |
| 5,479,611 | 12/1995 | Oyama | 395/185.01 |
| 5,555,391 | 9/1996 | De Subijana et al. | 395/850 |

OTHER PUBLICATIONS

Messmer, *The Indispensable PC Hardware Book*, pp;. 510–605, 777–788 (Addison–Wesley 1993).

*Primary Examiner*—Jack B. Harvey
*Assistant Examiner*—Paul R. Myers
*Attorney, Agent, or Firm*—Dorsey & Whitney LLP

[57] ABSTRACT

A virtual mass storage device implements a data manager for storing information on multiple physical mass storage devices. The virtual mass storage device is organized into blocks of information which are allocated to different physical devices, thereby enabling the physical devices to operate in parallel and increase the overall transfer rate of the virtual device.

38 Claims, 10 Drawing Sheets

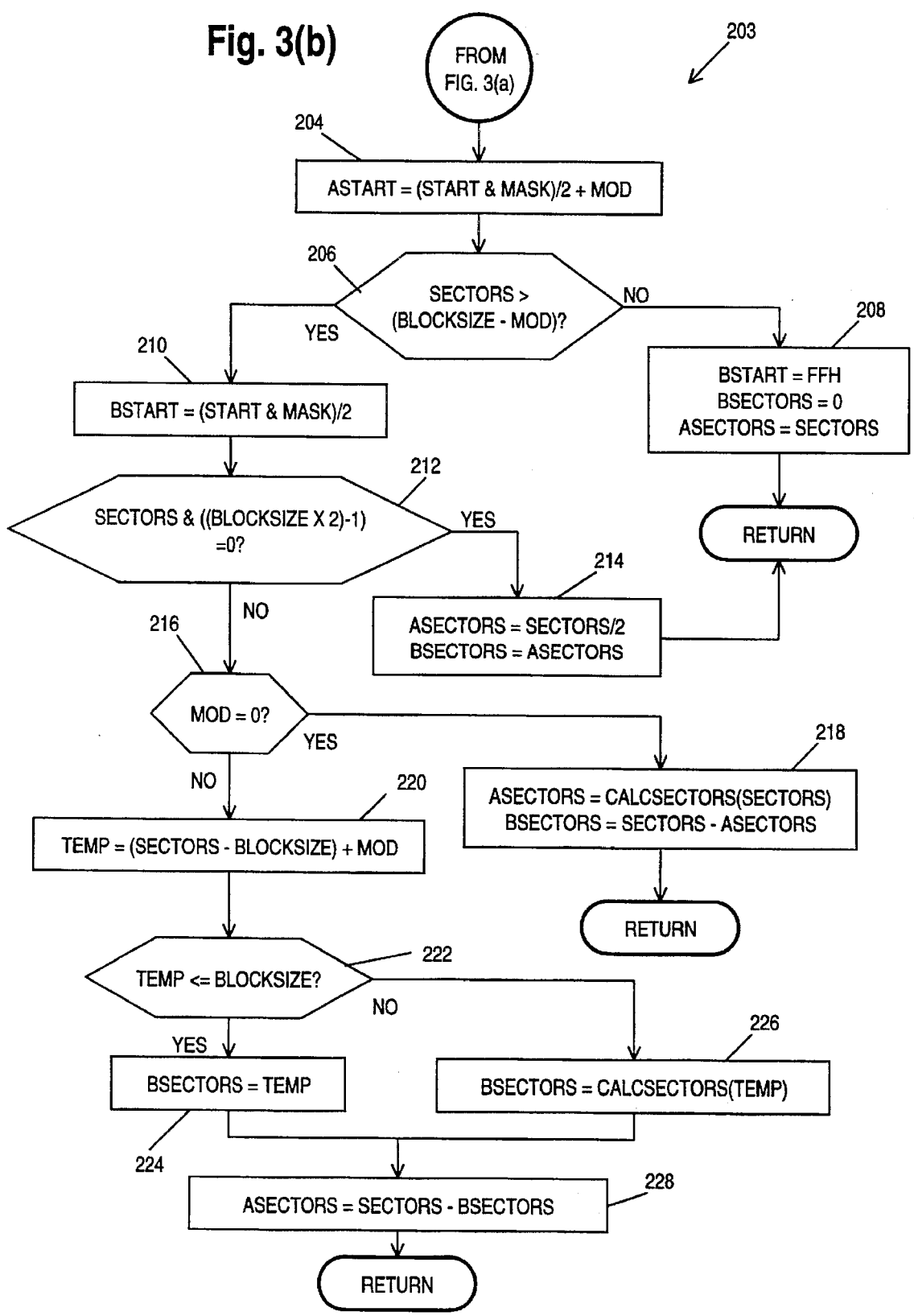

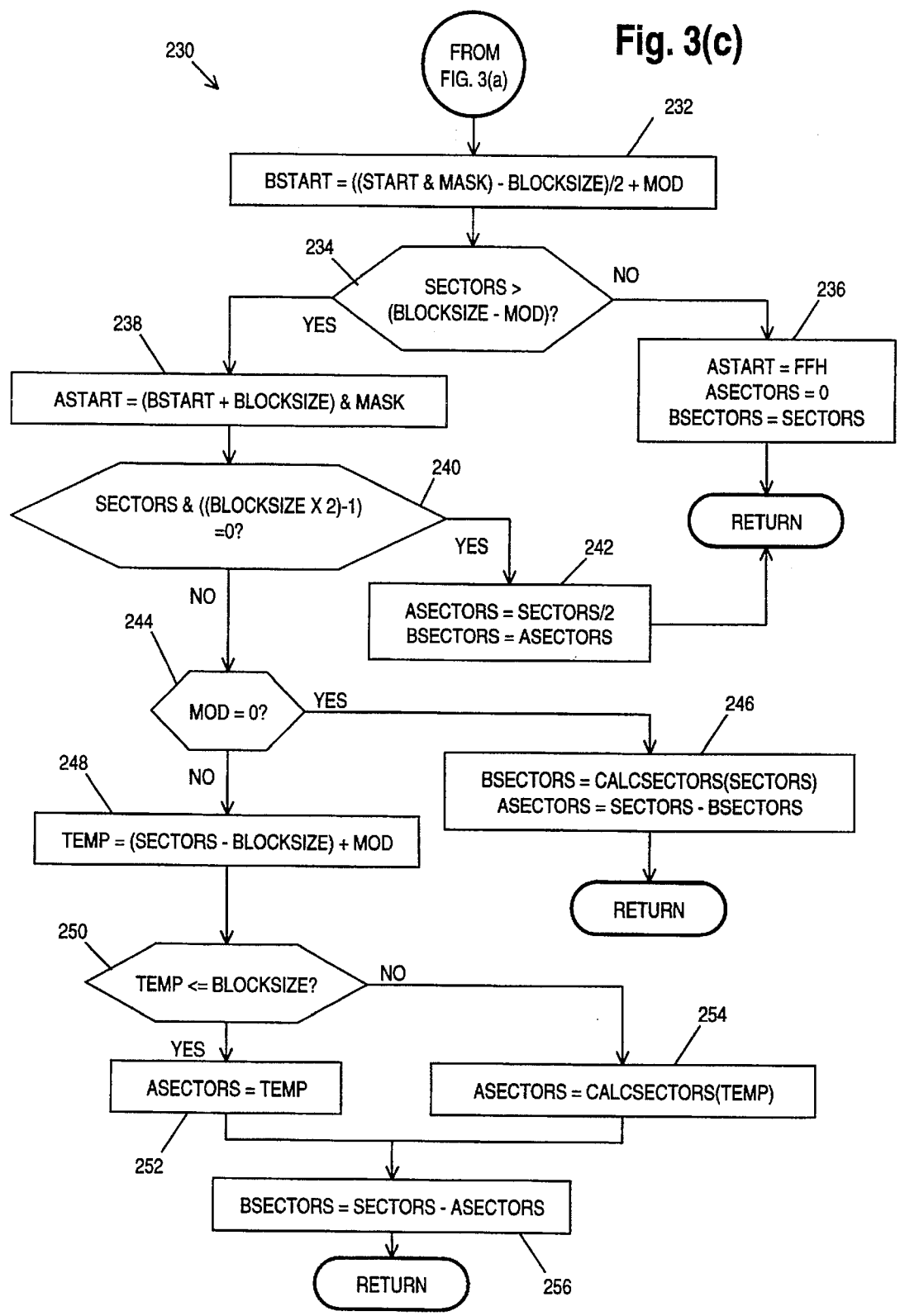

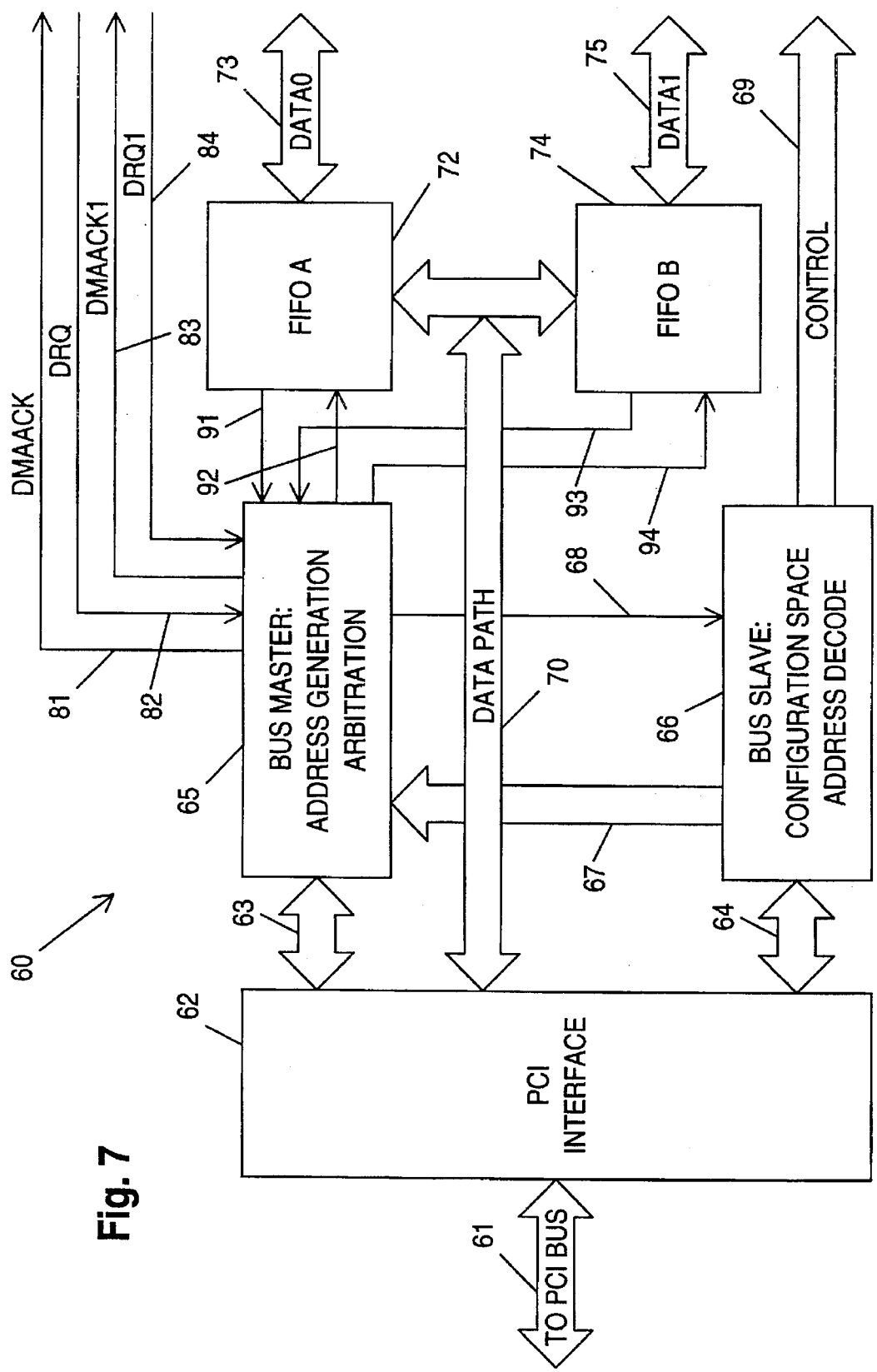

MULTI-DRIVE VIRTUAL MASS STORAGE DEVICE AND METHOD OF OPERATING SAME

FIELD OF THE INVENTION

The invention is generally directed to a mass storage device and a method for storing information principally for use with a computer system. More particularly, the invention is directed to a virtual mass storage device which is implemented on multiple physical storage devices.

BACKGROUND OF THE INVENTION

Computer hardware and software is constantly improved in terms of complexity, power and sophistication. Many advanced applications have increased the speed and processing requirements for computer hardware, e.g., some real-time applications such as full motion video playback and capture. Moreover, as computer software has become more complex, program sizes have increased and have required larger and more frequent data transfers between main memory systems (e.g., random access memories and cache memories) and various mass storage devices.

Mass storage devices, e.g., hard disk drives, optical drives, tape backup drives, etc., have also had to increase in size to accommodate larger program sizes and increased software memory and processing requirements.

To accommodate the increases in program sizes and frequencies of access to mass storage devices, a need has existed for increasing the data transfer rates of mass storage devices so that data transfers performed with the devices do not unduly slow down software loading, response and execution times.

Several interface standards have been developed to improve the data transfer rates of mass storage devices. For example, an IDE (intelligent drive electronics) standard has been developed for hard disk drives on PC-compatible personal computers. The controller for an IDE drive is incorporated on the drive instead of on a separate controller card. This arrangement decreases signal lengths and enables many of the low level functions (e.g., moving drive heads to particular tracks on the drive) to be handled directly by the controller.

The drive controller is connected via a dedicated high speed bus that is interfaced to the main memory system of a computer through an IDE interface circuit. In many systems, the IDE interface circuit is simply an extension of the PC bus interface, such as the PCI (peripheral component interconnect) bus used in some PC-compatible computer designs.

Another standard which has been developed is the SCSI (small computer systems interface) standard which has been developed for handling different peripheral components, including mass storage devices, MIDI ports, and other peripherals. Under the SCSI standard, each component includes a dedicated controller and is assigned a unique address for being controlled by a master controller interconnected thereto by a SCSI bus. Specific low level functions for a particular device are typically integrated into the device controller.

Both systems have advantages over many prior designs. Most importantly, they have the advantage of faster data transfer. This is due not only to improvements in hardware performance, but is also due to the incorporation of low level functions into the device controllers. The net result is that the processing requirements of the computer's main processing system are reduced. Data transfer rates across an IDE bus are currently be as high as 16 MByte/s for shorter data transfers, and data transfer rates across an SCSI bus are currently as high as 20 MByte/s, although these transfer rates are continuing to increase. Moreover, both systems allow different peripherals to be controlled according to a standard communication and command protocol, thus decreasing compatibility concerns.

However, with both the IDE and SCSI standards, the data transfer rates obtained across the respective buses are typically limited primarily by physical or mechanical limitations of the particular peripheral devices. For example, on a hard disk drive, the limiting factor on the data transfer rate of the drive is the time required to transfer data between the read/write heads and the physical media, which is often a function of the rotational speed of the physical media and the density of information stored on the media. Thus, while IDE or SCSI controllers may be able to transfer data at the aforementioned rates once information is obtained from the physical media of a device, the transfer rates of larger transfers (i.e., the "sustained data transfer rates") are constrained by the data transfer rate between the drive heads and the physical media.

Some devices may implement on-board sector or cache buffer memories to improve transfer rates for smaller data transfers. However, sustainable data transfer rates for larger transfers are still typically limited, at best, to about 4–8 MByte/s due to the physical limitations of the particular devices.

Improvements in physical device characteristics typically dictate increasing the mechanical or physical performance of the device, e.g., with a hard disk drive increasing the speed of rotation of the disks or increasing the number of bits of information per track. However, improving the mechanical characteristics of a device often comes at a significant cost in terms of development and manufacturability.

Therefore, a need has arisen for a mass storage device with an increased sustainable data transfer rate while accounting for the inherent physical limitations of the device. In particular, a need exists for increasing the sustainable data transfer rate of a mass storage device in a cost effective manner and with little or no hardware modifications to the device.

SUMMARY OF THE INVENTION

The invention addresses these and other problems associated with the prior art in providing a "virtual" mass storage device which implements multiple physical devices for storing information. The virtual mass storage device is organized into blocks of information which are allocated to different physical devices, thereby enabling the physical devices to operate in parallel and increase the overall transfer rate of the virtual device. By "virtual" mass storage device, what is meant is an implementation within a computer system that appears to the computer system to be a single mass storage device, which may be accessed by the computer system like other mass storage devices. However, in the virtual device, the interface to the multiple physical devices which implement the virtual device is "hidden" from the operating system and the software applications running on the computer system.

Physical mass storage devices typically include physical address spaces for storing data, which are formatted to be accessed via distinct physical addresses. The physical address spaces of many physical devices are arranged into physical sectors, and may be further arranged into physical blocks of physical sectors.

A preferred virtual device may utilize a data manager for handling data transfers with the physical devices. The data manager may define a virtual address space for accessing the data stored on the physical devices. The virtual address space may be accessed via distinct logical addresses, and the data manager may assign or map each logical address to a specific physical address on one of the physical devices. Similar to the physical devices, the logical addresses may be arranged into logical sectors, and further, into logical blocks of logical sectors.

Data transfer requests may be made to a preferred virtual device by requesting specific logical addresses within the virtual address space of the device. A data manager may then assign the logical addresses to physical addresses on the physical devices, and thereby handle the transfer of data with each of the physical devices. Multiple physical devices may, therefore, be accessed through a single virtual device handler.

In preferred virtual devices where ranges of logical addresses are mapped to physical sectors on more than one physical device, overall sustainable data transfer rates may be improved by requesting the physical devices to begin to access data at substantially the same time (which typically occurs at the physically or mechanically limited sustained data transfer rates of the physical devices). Through appropriate data management (e.g., buffering), non-selected physical devices may independently access data while a data transfer is performed between a host computer memory and a selected physical device. By alternating the selected physical device, data may be transferred to or from the host computer memory more continuously and at a faster data transfer rate which is typically not limited by the physical limitations of the physical devices.

A preferred virtual device may utilize conventional physical mass storage devices with little or no hardware modifications to the physical devices, thereby substantially reducing overall cost and complexity. Further reductions may even be realized by implementing a virtual device in the basic input/output routines of a host computer, whereby no modifications to the host computer hardware may be required. In this instance, many of the low level data transfer operations may be handled without requiring modifications to the host computer operating system or other higher level software applications.

Therefore, according to one aspect of the invention, there is provided a virtual mass storage device for use with a computer system, for storing data in a format including a plurality of logical sectors. The virtual device includes first and second physical mass storage devices, each for storing data in a format including a plurality of physical sectors; and control means for transferring data between the computer system and the first and second physical mass storage devices in response to a transfer request for a group of logical sectors. The control means includes determining means for determining respective first and second groups of physical sectors on the first and second physical mass storage devices that correspond to the group of logical sectors; first transferring means for transferring the first group of physical sectors between the computer system and the first physical mass storage device; and second transferring means for transferring the second group of physical sectors between the computer system and the second physical mass storage device.

According to another aspect of the invention, there is provided an apparatus for handling data transfers between a computer system and a plurality of physical mass storage devices, where each physical mass storage device has a physical address space arranged into a format accessed via a plurality of physical addresses. The virtual device includes a data manager for handling data transfers with the physical mass storage devices. The data manager includes a virtual address space arranged into a format accessed via a plurality of logical addresses, with each logical address corresponding to a physical address on one of the physical mass storage devices. In response to a transfer request for data at at least one logical address, the data manager handles the data transfer with the physical address on the appropriate physical mass storage device which corresponds to the logical address.

In accordance with an additional aspect of the invention, there is provided an apparatus for use in a PC-compatible computer system of the type having a main processing system having basic input/output routines that are accessible by an operating system of the computer system, and a bus interface circuit having first and second data ports. The apparatus includes first and second hard disk drives interconnected to the first and second data ports of the bus interface circuit. Each drive stores data in a format including a plurality of physical blocks, with each physical block including a plurality of physical sectors. Each drive is an intelligent drive having an on-board memory for holding at least one physical block of data so that each drive handles data transfer between the on-board memory and the physical media of the drive. Each drive also has a maximum sustainable data transfer rate between the physical media and the on-board memory. The apparatus also includes a virtual drive handler, implemented in the basic input/output routines of the main processing system, for transferring data between the main processing system and the first and second drives. The virtual drive handler has a virtual address space that is arranged in a format including a plurality of logical blocks each having a plurality of logical sectors. The logical blocks are the same size as the physical blocks. The virtual drive handler includes means for receiving a transfer request from the computer system including a starting logical sector and a total number of logical sectors to transfer; means for calculating a starting physical sector and a total number of physical sectors to transfer on each drive; means for respectively sending first and second transfer requests to the first and second drives, each transfer request including the corresponding starting physical sectors and total numbers of physical sectors to transfer; and means for alternately transferring even-numbered blocks of physical sectors between the on-board memory of the first drive and the main processing system and transferring odd-numbered blocks of physical sectors between the on-board memory of the second drive and the main processing system. The transfer of data between the on-board memory of each drive and the main processing system is at least twice the maximum sustainable data transfer rate of each drive.

In accordance with a further aspect of the invention, there is provided a method of transferring data between a computer system and first and second physical mass storage devices of the type in which data is stored in a format including a plurality of sectors. The method is responsive to a transfer request for at least one of a plurality of logical sectors. The method includes the steps of assigning the logical sector to a corresponding physical sector on one of the physical mass storage devices; and transferring the corresponding physical sector between the computer system and the physical mass storage device on which the corresponding physical sector is located.

These and other advantages and features, which characterize the invention, are set forth in the claims annexed hereto and forming a further part hereof. However, for a better understanding of the invention, and the advantages and objectives attained by its use, reference should be made to the Drawing, and to the following descriptive matter, in which there is described preferred embodiments of the invention.

BRIEF DESCRIPTION OF THE DRAWING

FIGS. 3(a), 3(b) and 3(c) are flow charts of the CALCULATE STARTING AND TOTAL SECTORS FOR DRIVES A AND B routine from the routine of FIG. 2.

FIG. 7 is a functional block diagram of an alternate virtual mass storage device implementing a direct memory access circuit with first-in/first-out registers.

DETAILED DESCRIPTION OF THE PREFERRED EMBODIMENTS

Figure 1A:
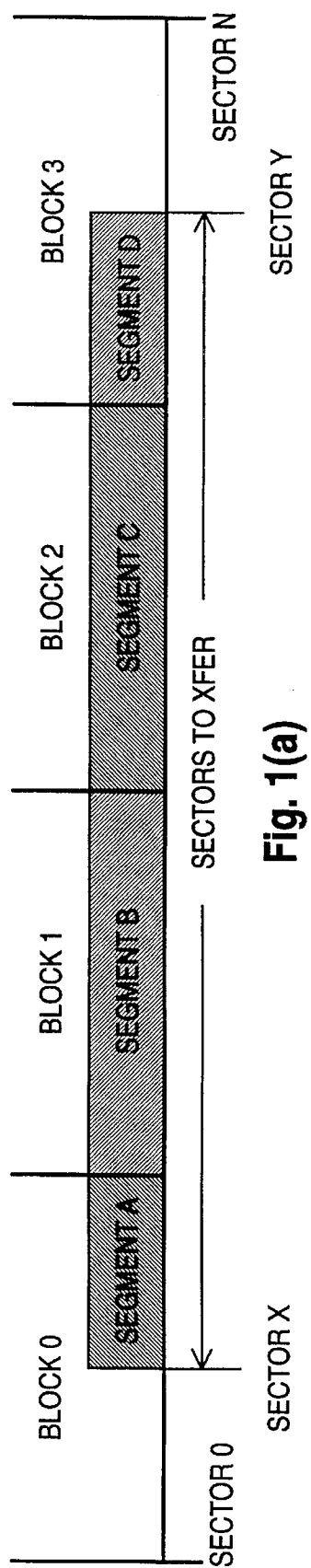
FIG. 1(a) is an illustration of the organization of storage information on a virtual mass storage device consistent with the principles of the invention.
Figure 1B:
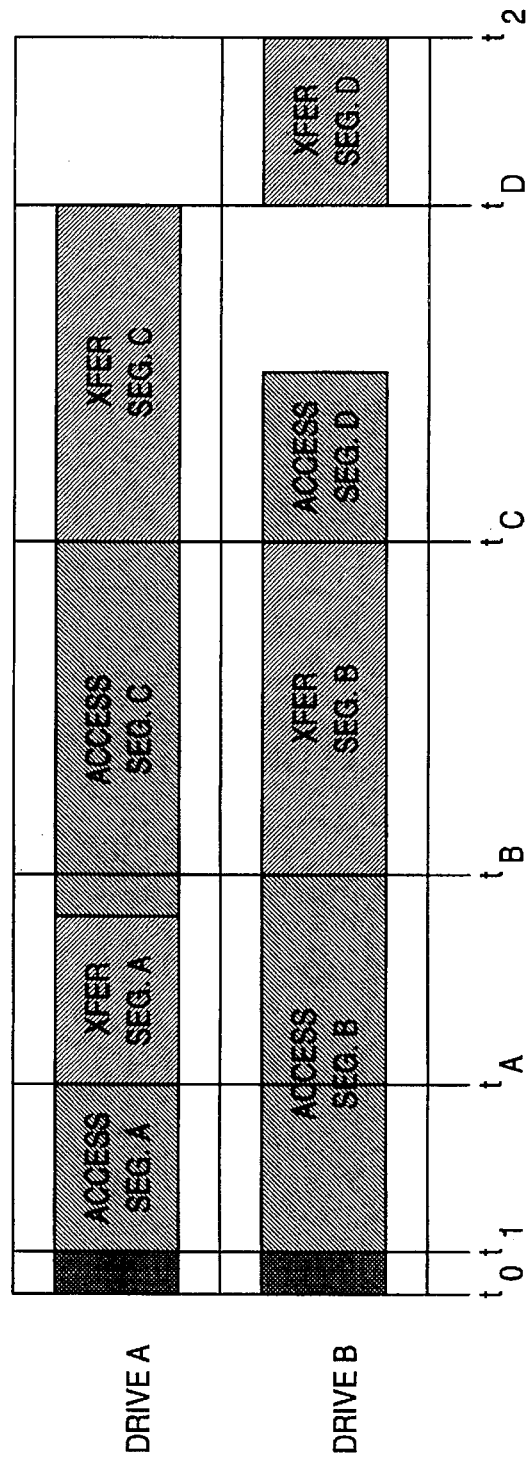
FIG. 1(b) is an illustration of the allocation of the storage information of FIG. 1(a) on two physical mass storage devices.

Turning to the Drawing, wherein like numbers denote like parts throughout the several views, FIGS. 1(a) and 1(b) illustrate the basic principles of operation for a preferred multi-drive virtual mass storage device consistent with the principles of the invention.

The preferred virtual device preferably allocates information in a block-by-block fashion between two or more physical storage devices. This is in contrast to conventional storage devices, where data is typically allocated on a drive-by-drive, or device-by-device, basis.

The preferred virtual device uses multiple physical devices which operate in parallel (i.e., multi-task) to access information, thereby increasing the overall transfer rate nearly proportional to the number of physical devices used for the virtual device. The preferred virtual device may utilize hard disk drives, although other physical devices may also be used, particularly in applications where the physical limitations of the physical devices are limiting factors on the overall sustainable data transfer rates of the devices.

FIG. 1(a) illustrates the organization of information on a preferred virtual storage device. Information on the virtual device is preferably organized into a virtual address space having a plurality of distinct logical addresses which are preferably grouped into logical sectors, (e.g., sectors 0–N), each of which preferably contains the same number of bytes as the physical sectors of the physical devices being used to implement the virtual device. Most physical devices typically have sector sizes of 512 bytes/sector, although other sizes could be used.

The logical sectors on the preferred device are preferably grouped into logical blocks (e.g., blocks 0–3) each of which has an integral number of sectors. Preferably the size of the logical blocks is selected to correspond to the size of the on-board memories on the physical devices being used to implement the virtual device. For most conventional hard disk drives, for example, the block size is preferably selected to be between 8 and 32 sectors/block, most preferably about 16 sectors/block.

The logical blocks and sectors for the virtual device are preferably aligned with the physical blocks and sectors on the physical device to facilitate processing, although this alignment is not required. Moreover, the logical blocks and sectors are preferably integral powers of two, which, as will be seen below, enables some processing efficiencies or shortcuts (e.g., through bit masking, bit shifting, or bit testing) to be obtained in the preferred data manager routines for the preferred virtual device.

The preferred virtual device may be accessed similar to other access storage devices, that is, by drive number and sector number. For example, on a PC-compatible computer system running under MS-DOS, the virtual device may be assigned a drive number (e.g., C:, D:, etc.), with the total number of logical sectors on the virtual device being equal to the sum of physical sectors on all the physical devices used to implement the virtual device.

In the preferred virtual device, a data manager assigns or maps individual logical addresses to corresponding physical addresses on one of the physical mass storage devices. Then the data manager may perform data transfer operations for requested logical addresses by determining the corresponding physical addresses and transferring the corresponding physical addresses between the computer system and the appropriate physical mass storage devices.

Logical addresses may be assigned or mapped to multiple physical devices in several different manners consistent with the invention. For example, in the preferred virtual device shown in FIG. 1(a), sectors of logical addresses may be allocated between two physical devices using block-by-block interleaving, where even blocks (e.g., blocks 0 and 2) are allocated to drive A, and odd blocks (e.g., blocks 1 and 3) are allocated to drive B.

Other algorithms for allocating logical addresses to physical devices may be used consistent with the invention, such as sector-by-sector interleaving or track-by-track interleaving, etc. It will also be appreciated that if more than two physical drives are used, the blocks may be allocated accordingly. For example, blocks may be allocated to four physical drives according to a simple divide-by-four algorithm where blocks x, x+1, x+2, and x+3 (where x is divisible by 4) are respectively allocated to the four drives.

FIG. 1(a) shows a range of logical sectors to be transferred (e.g., sector x to sector y) for illustrating the operation of the preferred virtual device. The sectors are preferably partitioned along block boundaries into separate segments (e.g., segments A, B, C and D). Segments B and C are shown as full segments which are equal in size to a logical block. Segments A and D represent partial segments which encompass only a portion of a logical block.

For performing a transfer to or from the preferred virtual device, a request for a group of logical addresses, typically a group of logical sectors, is required, preferably by identifying a starting logical sector value and a total number of logical sectors value. From this information, corresponding groups of physical sectors on each physical drive may be calculated, preferably by determining values for the starting physical sector and the total numbers of physical sectors to transfer for each physical device. The physical sector values may be calculated in several different manners, one of which is discussed below with reference to FIGS. 3(a), 3(b), 3(c) and 4. The physical sector values may then be used to command each physical device to transfer the requested groups of sectors. All of the physical devices may be controlled substantially simultaneously, and, when using intelligent devices such as IDE hard disk drives, the controllers on the physical devices can perform many of the data transfer functions independent of the master virtual device data manager or controller, thereby leaving the data manager to coordinate the data transfer between the physical devices and the main memory of the host computer.

The preferred virtual device implements hard drives which include on-board memories for temporarily holding a fixed number of sectors. After transfers have been requested from the physical devices, a data manager in the preferred virtual device waits for the physical devices to complete their transfers, then it subsequently performs the actual transfers between the main memory and the device on-board memories as the on-board memories become ready to transfer data. The transfers between the main memory and the physical device on-board memories continue as each drive becomes ready, until all the transfers between the physical devices and the main memory have been performed.

For example, FIG. 1(b) shows an exemplary read operation for the sectors shown in FIG. 1(a). At time $t_0$, the preferred virtual device commands drives A and B to perform the requested transfer during a "command" frame. At time $t_1$, both drives begin accessing their physical medias to load their respective on-board memories with sector data during an "access" frame.

At time $t_A$, the on-board memory of drive A is full, and the drive will signal the virtual device data manager accordingly. At this point, the data manager may perform the memory transfer from the drive on-board memory to the host computer memory during an "xfer" frame. It will be appreciated that this transfer may occur at the maximum data transfer rate of the transfer protocol being used, since data transfers between an on-board memory and host computer memory are not typically limited by the physical or mechanical restraints of the physical devices.

While the data transfer of segment A is performed by the virtual device, drive B continues to load its on-board memory with data from segment B. Further, once the data transfer of segment A is complete, drive A may begin to load its on-board buffer with the information in segment C. Then, when drive B has completed loading its on-board memory, the data manager may begin, at time $t_B$, to transfer segment B to the host computer main memory.

The access operations that load the on-board memories of the drives, and the subsequent transfers of data ("xfers") from the on-board memory of the drives to the host computer memory (e.g., at time $t_C$ for segment C and at time $t_D$ for segment D), are preferably interleaved for each physical device until the entire transfer is complete (e.g., at time $t_2$).

A write operation operates in substantially the same manner as the read operation shown in FIG. 1(b). The primary difference is that the initial access operation on each drive merely queues up the drive to perform the data transfer operation, and does not actually transfer data to the physical media of the drive. Thus, the initial access frames are typically shorter than for read operations.

It will be appreciated that the actual steps in the memory transfer and access operations will vary depending upon the particular hardware and the types of drives being used. It will also be appreciated that various modifications to this basic routine, many of which are described below, may also be made consistent with the principles of the invention.

For example, rather than maintaining the block segregation of sectors as shown in FIG. 1(b) to transfer each individual segment while maintaining block boundaries, full blocks of data may instead be transferred irrespective block boundaries. For example, with the data of FIG. 1(a), the first transfer of data may be a full block of data containing segment A and a portion of segment C, rather than simply transferring the partial segment A. A routine for handling this alternate operation is discussed below with reference to FIGS. 5(a), 5(b) and 5(c).

In addition, the transfer operation shown in FIG. 1(b) represents a virtual device which can only pass information between one of the physical device on-board memories and the main memory of the host computer. Thus, as shown in FIG. 1(b), the transfer of data such as segment D from the on-board memory of Drive B may have to wait until the transfer of segment C is complete on Drive A. It will be appreciated, however, that various modifications may be made to improve the "multi-tasking" functionality of the transfer between the physical device on-board memories and the host computer memory. For example, first-in/first-out (FIFO) registers and/or direct memory access (DMA) circuitry may be used to temporarily store information related to a non-selected physical device while a transfer is occurring between a selected physical device and the host computer memory. Then, once the transfer is complete on the selected device, the information from the non-selected device may be burst into or from the main memory at an extremely high rate by the FIFO and/or DMA circuitry. One such example of this modification is discussed below with relation to FIG. 7.

Read/Write Operation Program Flows

Figure 2:
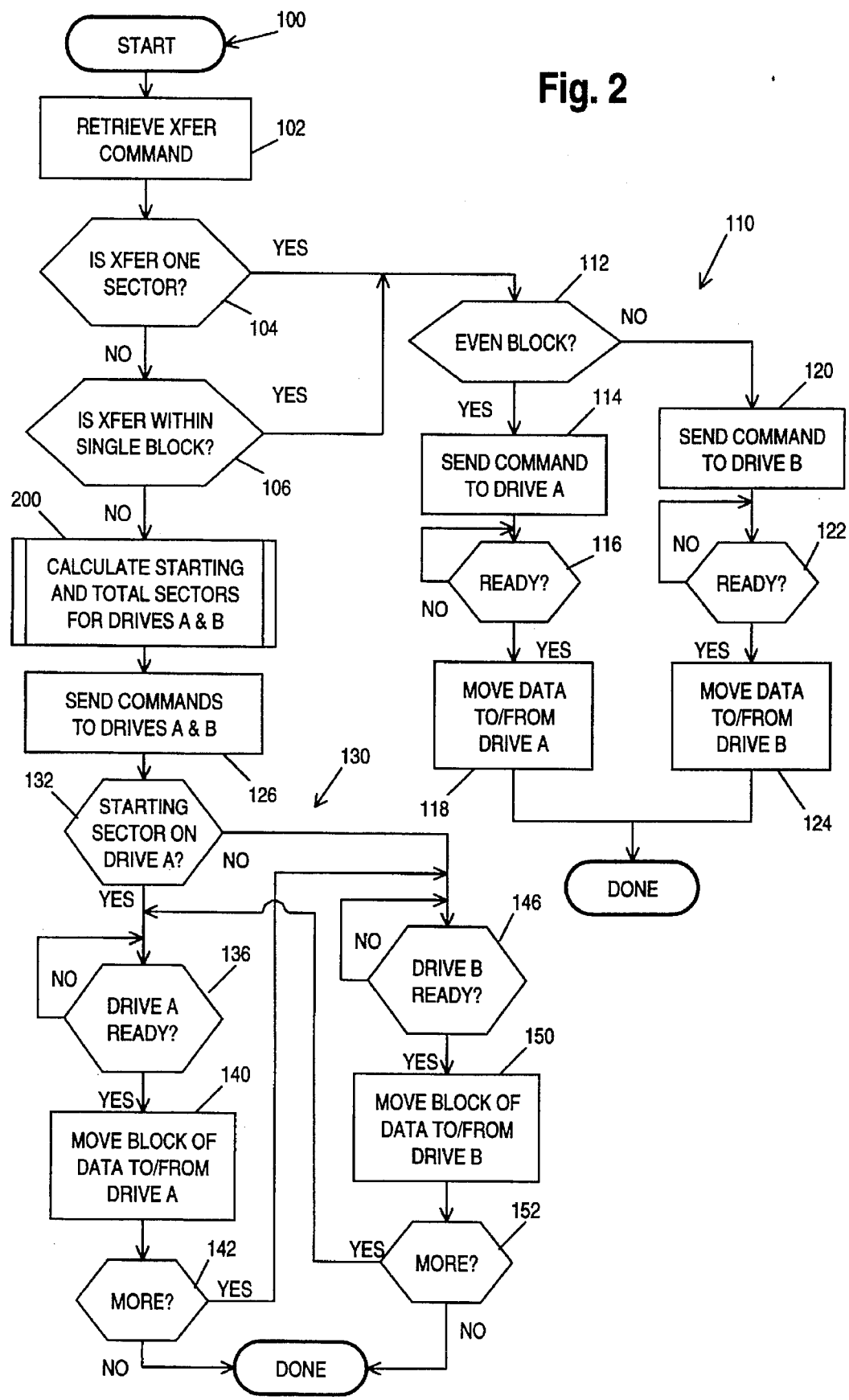
FIG. 2 is a flow chart of a data management routine for a preferred virtual mass storage device consistent with the principles of the invention.

FIG. 2 shows the program flow of a preferred data manager routine 100 for performing read or write operations with the preferred virtual mass storage device. The preferred routine preferably receives as input a starting logical sector "START", the total number of logical sectors to transfer "SECTORS", and a pointer "ADDRESSPOINT" to the starting address of the memory range in the host computer memory with which to perform the transfer.

Sectors may be accessed based upon a composite address that comprises a number of variables specific to the particular physical geometry of a storage device, e.g., by head, track (or cylinder) and sector numbers. More preferably, sectors may be accessed by logical block addressing (LBA), whereby each sector on a storage device is given a unique address which is independent of the physical geometry of a device. Using an intelligent storage device such as an IDE or SCSI hard disk drive, the drive controller handles mapping an LBA sector address to a physical sector on the drive based upon the drive's geometry. Thus, the host computer system does not have to accommodate for different physical drive geometries.

In block 102 of routine 100, a transfer request or command is retrieved. Next, in blocks 104 and 106, the transfer variables are tested to determine two separate conditions are preferably handled separately to speed up smaller transfers. In block 104, the transfer is tested to determined if the total transfer is one sector. In block 106, the transfer is tested to determine if the range of sectors are within a single block. If either condition is true, the transfer needs to access only one of the drives, so control passes to block 112 to test which drive the transfer is on by testing whether the transfer is in an odd or even block.

If the transfer is in an even block, control passes to block 114, where an appropriate command is sent to Drive A to transfer the desired range of sectors, corresponding to the "command" frames (at time $t_0$ to time $t_1$ as shown in FIG. 1(b)). Also, in block 114, a starting physical sector on Drive A may be calculated from the starting logical sector (e.g., in the manner shown in block 204 of FIG. 3(b), discussed below). Next, in block 116, routine 100 waits until Drive A is ready, corresponding to the "access" time frames in FIG. 1(b). When Drive A signals it is ready, control passes to block 118 to handle the data transfer between the host computer memory and Drive A, corresponding to the "xfer" time frames shown in FIG. 1(b). Once the range of data has been transferred in block 118, Routine 100 terminates.

Returning to block 112, if the transfer is an odd block, the transfer occurs on Drive B, and control passes to block 120 to calculate a starting sector on Drive B and command Drive B to perform the requested transfer. Next, in block 122, routine 100 waits until Drive B is ready. When Drive B becomes ready, the data transfer between the host computer memory and Drive B is performed in block 124 before the routine terminates.

Turning to blocks 104 and 106, if neither of the aforementioned special conditions have occurred, control passes to block 200 to calculate or determine the starting and total numbers of physical sectors for Drives A and B from the START and SECTORS values corresponding to the range of logical sectors to transfer.

Figure 3A:
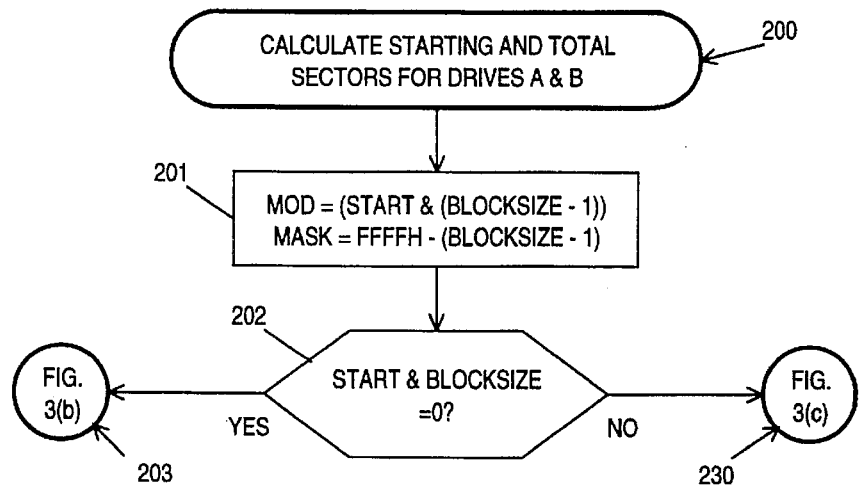

FIGS. 3(a), 3(b) and 3(c) show the CALCULATE STARTING AND TOTAL SECTORS FOR DRIVES A & B routine 200 in greater detail. As discussed above, routine 200 preferably receives as inputs the value START, which is the starting logical sector to transfer (preferably an LBA address), and the value SECTORS, which is the total number of logical sectors to transfer. Routine 200 preferably returns the values ASTART and BSTART, which are the starting physical sectors on the Drives A and B, respectively (also LBA addresses), and the values ASECTORS and BSECTORS, which are the total number of physical sectors to transfer on Drives A and B, respectively.

Furthermore, the value BLOCKSIZE, which is the number of sectors per block, is a known constant for the particular virtual device being implemented. For routine 200, BLOCKSIZE is preferably a power of two to simplify various masking and other mathematical operations as will become evident below. However, it will nonetheless be appreciated that other values for BLOCKSIZE may also be used consistent with the invention.

First, in block 201, routine 200 calculates some preliminary values which are used in other calculations within the routine. A value MOD is calculated to be equal to START AND (BLOCKSIZE−1), which represents the number of sectors that START is offset from a block boundary. A value MASK is calculated to be equal to FFFF(hex)−(BLOCKSIZE−1), which, when ANDed with the value START, produces a sector address representing the first sector in the starting block (which may also be calculated by subtracting MOD from START).

Next, in block 202, routine 200 tests whether (START AND BLOCKSIZE)=0, which is used to determine whether the starting logical sector START is on Drive A or Drive B. If the starting logical sector is on Drive A, the test is satisfied, and control passes to routine 203 (shown in FIG. 3(b)). If the starting logical sector is on Drive B, the test is not satisfied, and control passes to routine 230 (shown in FIG. 3(c)).

Turning to FIG. 3(b), for routine 203, control first passes to block 204 to calculate ASTART, which is the starting sector on Drive A. ASTART is set to equal (START AND MASK)/2+MOD.

Next, in block 206, routine 200 determines whether a block boundary is crossed in the transfer. This is preferably performed by comparing SECTORS with the value (BLOCKSIZE−MOD). If SECTORS is less than or equal to (BLOCKSIZE−MOD), then only data on Drive A is being transferred. Thus, in block 208, BSTART is set to FF(hex), BSECTORS is set to 0, and ASECTORS is set to SECTORS to represent that all of the data to be transferred will come from Drive A. Then, control may return to routine 100.

However, if a block boundary is crossed, control passes to block 210 to calculate BSTART, the starting sector on Drive B. BSTART is set to equal (START AND MASK)/2.

Next, in block 212, SECTORS AND ((BLOCKSIZE×2)−1) is compared with zero. A returned value of zero represents a special case where the total number of sectors is an integral multiple of 2×BLOCKSIZE, whereby each drive will transfer an integral number of blocks of sectors. Thus, in block 214, the number of sectors on each drive, ASECTORS and BSECTORS, will be set to SECTORS/2. Then, control may return to main routine 100.

If the aforementioned special case has not occurred, control passes to block 216 to compare MOD with zero, that is, to determine whether the starting logical sector START is at the beginning of a logical block. If so, control passes to block 218 to calculate ASECTORS and BSECTORS, the total number of sectors on each drive.

ASECTORS is calculated in block 218 by calling a CALCSECTORS routine 260 (shown in FIG. 4 and discussed below) with an input variable of SECTORS, the total number of sectors to transfer. BSECTORS is calculated by subtracting ASECTORS from SECTORS. Control then returns to main routine 100.

In block 218, the number of sectors on each drive were calculated by first calculating the number of sectors on Drive A. However, if starting logical sector START is not at the beginning of a logical block, control preferably passes to block 220 to calculate the number of sectors on each drive by first computing the number of sectors on Drive B.

In block 220, a variable TEMP is set to be equivalent to the total number of sectors less the number of sectors in the starting block on Drive A, that is, (SECTORS−BLOCKSIZE)+MOD. In block 222, this value is compared with BLOCKSIZE. If TEMP is less than or equal to BLOCKSIZE, control passes to block 224 since the last sector will be in Drive B, and therefore, BSECTORS will be equal to TEMP. If TEMP is greater than BLOCKSIZE, however, control passes to block 226 to call CALCSECTORS routine 260 (discussed below) with an input variable of TEMP. In either case, control passes to block 228 to calculate ASECTORS by subtracting BSECTORS from SECTORS, and control is then returned to main routine 100.

Figure 4:
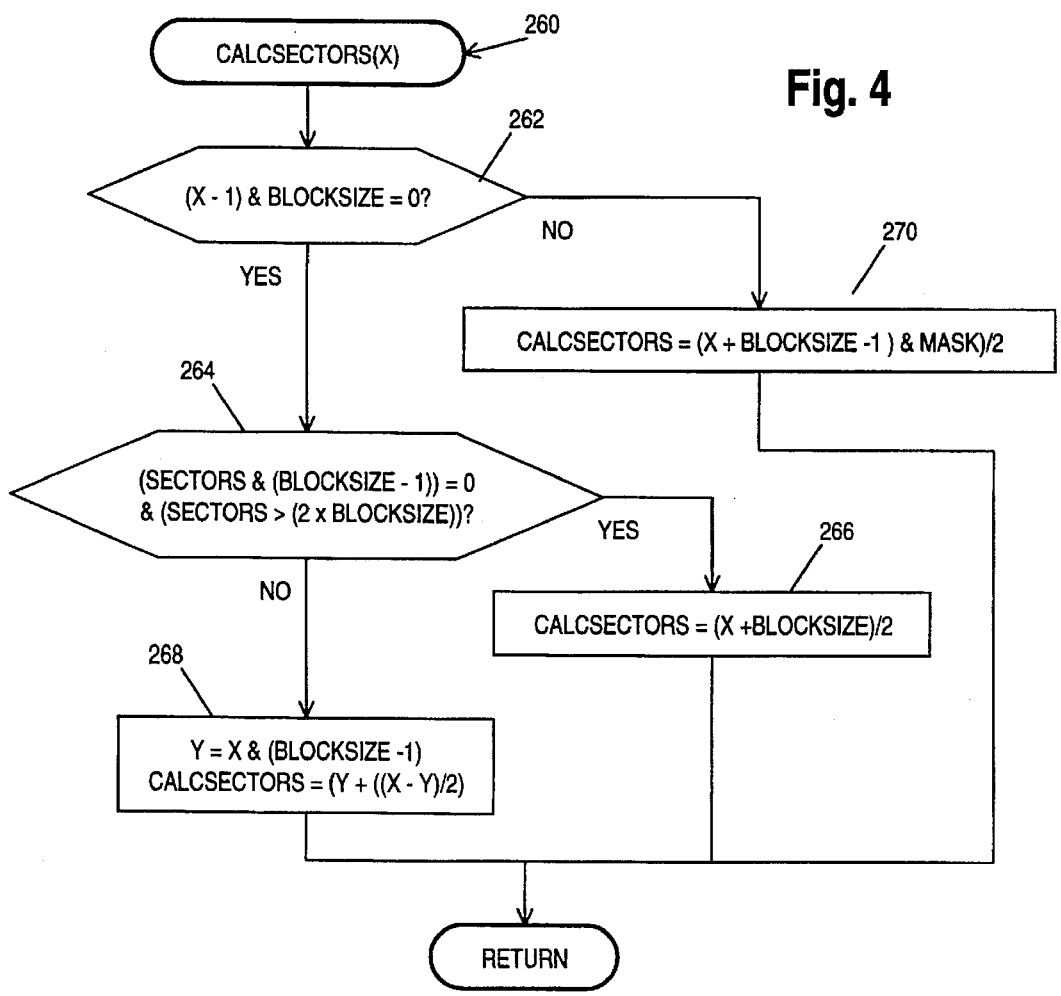
FIG. 4 is a flow chart of the CALCSECTORS routine from the routine of FIGS. 3(a), 3(b) and 3(c).

Turning to FIG. 4, CALCSECTORS routine 260 is shown having an input variable X. First, in block 262, the value (X−1) AND BLOCKSIZE is compared with zero. A result of zero indicates that the last sector will be on the same drive as the calling drive, which is the drive for which the number of sectors is being calculated (i.e., Drive A when routine 260 is called in block 218, Drive B when routine 260 is called in block 226—both of which are shown in FIG. 3(b)).

If the aforementioned value is not zero (last sector on non-calling drive), control passes to block 270 to return to routine 200 with a result value of ((X+BLOCKSIZE−1) & MASK)/2. The masking operation removes the last sectors from the non-calling drive from the calculations of the number of sectors on the calling drive.

If the aforementioned value is zero (last sector on calling drive), control passes to block 264 to test for a special condition, where the number of sectors are an integral number of blocks and are greater than two times the blocksize, that is, where SECTORS AND (BLOCKSIZE−1)=0 and SECTORS>(2×BLOCKSIZE).

If both conditions are satisfied, control passes to block 266 to return to routine 200 with a result value of (X+BLOCKSIZE)/2. If both conditions are not satisfied, control passes to block 268, where an intermediate value Y is calculated to be the offset in the number of sectors from an integral number of blocks, that is, X AND (BLOCKSIZE−1), which is the remainder when SECTORS is divided by BLOCKSIZE. Then, block 266 returns to routine 200 with a result value of Y+(X−Y)/2.

Turning to FIG. 3(c), routine 230 is executed to calculate the starting and total sectors on each drive when the starting sector is on Drive B. Routine 230 is generally the same as routine 203 which is executed when the starting sector is on Drive A. However, several calculations are different for routine 230 due to the fact that the starting sector on Drive A will be after, rather than before, the starting sector on Drive B.

For routine 230, control first passes to block 232 to calculate BSTART, which is the starting sector on Drive B. BSTART is equal to ((START AND MASK)−BLOCKSIZE)/2+MOD.

Next, in block 234, routine 200 determines whether a block boundary is crossed in the transfer by comparing SECTORS with the value (BLOCKSIZE−MOD). If SECTORS is less than or equal to (BLOCKSIZE−MOD), then only data on Drive B is being transferred. Consequently, in block 236. ASTART is set to FF(hex), ASECTORS is set to 0, and BSECTORS is set to SECTORS to represent that all of the data to be transferred will come from Drive B. Then, control may return to main routine 100.

If a block boundary is crossed, control passes to block 238 to calculate ASTART, the starting sector on Drive A. ASTART is equal to (BSTART+BLOCKSIZE) AND MASK.

Next, in block 240, SECTORS AND ((BLOCKSIZE×2) −1) is compared with zero. If so, in block 242, the number of sectors on each drive, ASECTORS and BSECTORS, are set to SECTORS/2, and control is returned to main routine 100.

If not, control passes to block 244 to compare MOD with zero. If MOD is zero, control passes to block 246 to calculate ASECTORS and BSECTORS. BSECTORS is calculated in block 246 by calling CALCSECTORS routine 260 (shown in FIG. 4) with an input variable of SECTORS. ASECTORS is calculated by subtracting BSECTORS from SECTORS. Control then returns to main routine 100.

If MOD does not equal zero, control instead passes to block 248 to calculate a variable TEMP, which is equivalent to (SECTORS−BLOCKSIZE)+MOD. In block 250, this value is compared with BLOCKSIZE. If TEMP is less than or equal to BLOCKSIZE, control passes to block 252, where ASECTORS is set to equal TEMP. If TEMP is greater than BLOCKSIZE, however, control passes to block 254 to call CALCSECTORS routine 260 with an input variable of TEMP. In either case, control passes to block 256 to calculate BSECTORS by subtracting ASECTORS from SECTORS, and control is then returned to main routine 100.

Returning to FIG. 2, once the values ASTART, BSTART, ASECTORS and BSECTORS have been calculated in routine 200, control passes to block 126 to send the appropriate transfer commands to Drives A and B. It will be appreciated that the actual structure of the commands will depend upon the particular command protocols of the drives and interface being used, e.g., using the IDE standard which is known in the art.

Next, a transfer data routine 130 executes to alternately transfer the groups of physical sectors blockwise between the host computer and Drives A and B. First, block 132 determines whether the starting logical sector is on Drive A or Drive B. If on Drive A, control passes first to the Drive A transfer routine starting at block 136. If on Drive B, control passes first to the Drive B transfer routine starting at block 146.

In block 136, routine 130 waits until Drive A is ready (the "access" time frames). When Drive A is ready, control passes to block 140 to transfer a block of data between the host computer memory and the on-board memory of Drive A (the "xfer" time frames). Then, in block 142, the routine determines whether there is any more data to transfer. If not, then routine 130 terminates.

If there is more data to transfer, control passes to block 146 to wait until Drive B is ready. When Drive B becomes ready, block 150 transfers a block of data between the host computer memory and the on-board memory of Drive B. Then, in block 142, the routine determines whether there is any more data to transfer. If there isn't, routines 130 terminates. However, if there is, then control returns to block 136.

Blocks of data on Drives A and B are therefore transferred one at a time and in an interleaved fashion with routine 130, starting with the appropriate drive transfer routine corresponding to the starting drive for the data transfer.

It will be appreciated that routine 130 shows a block-aligned embodiment of the invention where groups of sectors are transferred along block boundaries such that sectors from only one block are transferred at a time, similar to the manner discussed above with relation to FIG. 1(b).

Figure 5A:
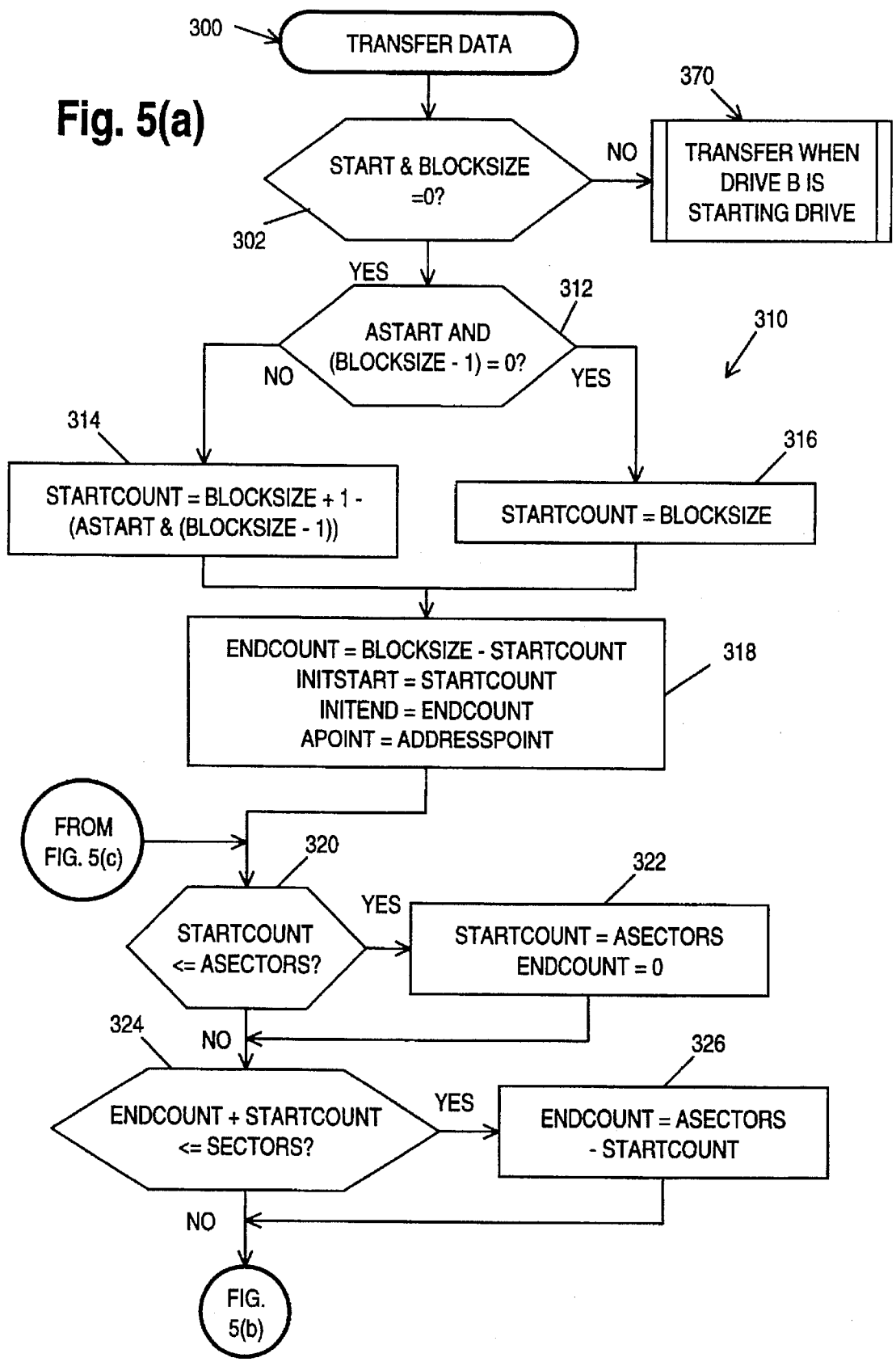
FIGS. 5(a), 5(b) and 5(c) are flow charts of an alternate TRANSFER DATA routine to that used in the routine of FIG. 2.
Figure 5B:
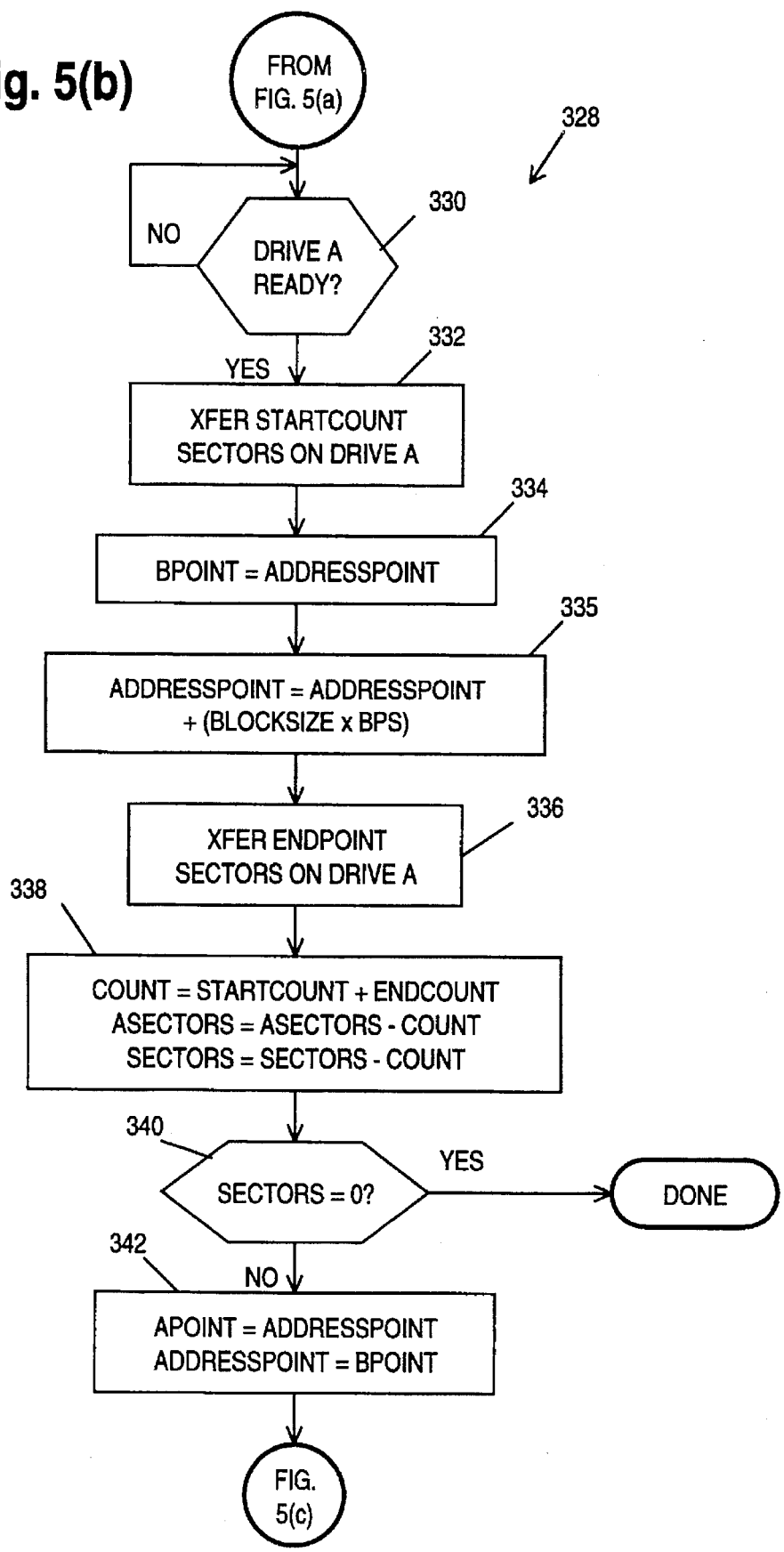
Figure 5C:
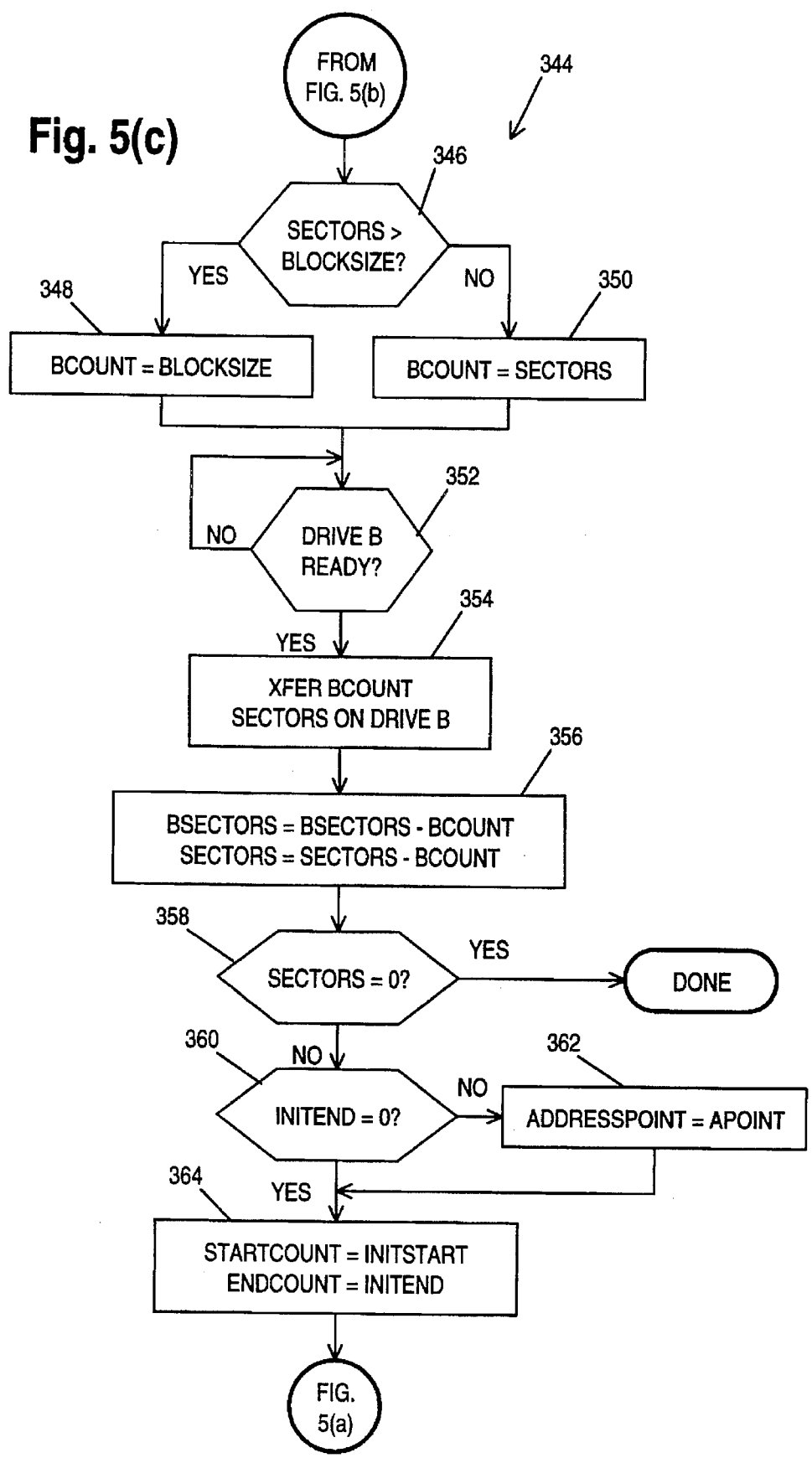

FIGS. 5(a), 5(b) and 5(c) show a TRANSFER DATA routine 300 for use in main routine 100 as an alternate to the transfer data routine 130 of FIG. 3, whereby full blocks of physical sectors are transferred irrespective of block boundaries. Each alternate transfer to a drive preferably transfers a full block of physical sectors. If the initial block of physical sectors is less than a full block, then the initial transfer transfers the initial block and a portion of the next block on the drive. This routine has the advantage of faster overall operation than routine 130, as well as less complex drive handling, since intelligent physical devices such as IDE-compatible hard disk drives will typically operate most efficiently when full blocks of data are transferred to or from the on-board memories of the devices.

As shown in FIG. 5(a), routine 300 first checks in block 302 whether the starting sector is on Drive A or Drive B, by checking if (START AND BLOCKSIZE)=0. If the starting sector is on Drive A, control passes to routine 310 to handle the transfer of data when Drive A is the starting drive. First, routine 310 calculates the number of sectors on either side of the block boundary on Drive A, represented by the variables STARTCOUNT and ENDCOUNT. In block 312, ASTART AND (BLOCKSIZE−1) is compared to zero to determine whether the starting sector on Drive A is block aligned. If so, STARTCOUNT is set to equal BLOCKSIZE in block 316, indicating that each transfer on Drive A will be from a single block. If not, STARTCOUNT is set to equal (BLOCKSIZE+1)−(ASTART AND (BLOCKSIZE−1)) in block 314, representing the number of sectors to be transferred in the initial block on Drive A.

After blocks 314 and 316, control passes to block 318 to calculate ENDCOUNT, which is equal to BLOCKSIZE−STARTCOUNT, the total number of sectors required to fill a full block after transferring the sectors in the initial block on Drive A. In addition, secondary storage variables, INITSTART and INITEND are set with the initial values of STARTCOUNT and ENDCOUNT, respectively. Finally, the address pointer for Drive A, APOINT, is initially set to equal ADDRESSPOINT, the pointer to the starting address in the host computer memory for the requested data transfer.

Next, in blocks 320 and 324, two special conditions are tested. First, in block 320, STARTCOUNT is compared with ASECTORS. If STARTCOUNT is less than or equal to ASECTORS, STARTCOUNT is set in block 322 to equal ASECTORS, and ENDCOUNT is set to equal zero. Second, in block 324, ENDCOUNT+STARTCOUNT is compared to SECTORS. If ENDCOUNT+ STARTCOUNT is less than or equal to SECTORS, ENDCOUNT is set to equal ASECTORS−STARTCOUNT.

Control then passes to routine 328 in FIG. 5(b). In block 330, routine 328 waits until Drive A is ready. When Drive A becomes ready, control passes to block 332, where STARTCOUNT sectors are transferred between the on-board memory of Drive A and the host computer memory (e.g., by transferring each sector and decrementing a loop variable starting at STARTCOUNT until the loop variable reaches zero). The pointer to main memory ADDRESSPOINT is preferably incremented automatically by the transfer operation, and will point to the next address in the host computer memory after the data transfer.

In block 334, the current value of ADDRESSPOINT is saved in BPOINT, the address pointer for Drive B. Next, in block 335, ADDRESSPOINT is incremented by the value (BLOCKSIZE×BPS), where BPS is the total number of bytes per sector, typically 512 bytes/sector. Next, ENDPOINT sectors are transferred between the on-board memory of Drive A and the host computer memory, whereby ADDRESSPOINT will be automatically updated by the data transfer.

Next, in block 338, the values for ASECTORS and SECTORS are decremented to reflect the completion of the transfer of STARTCOUNT and ENDCOUNT sectors on Drive A. First, a temporary value COUNT is set to equal STARTCOUNT+ENDCOUNT. Then ASECTORS and BSECTORS are each decremented by COUNT.

In block 340, the total number of sectors remaining to be transferred, SECTORS, is compared with zero. If there are no sectors remaining to be transferred, then the routine terminates. If, on the other hand, additional sectors remain to be transferred, control passes to block 342 to save the current ADDRESSPOINT in APOINT, and to reset ADDRESSPOINT with the value of BPOINT.

Next, control passes to routine 344 as shown in FIG. 5(c). In block 346, the number of sectors remaining, SECTORS, are compared with BLOCKSIZE. If SECTORS is greater than BLOCKSIZE, control passes to block 348 to set BCOUNT, the number of sectors to transfer on Drive B in the current pass, to equal BLOCKSIZE, representing a full block to transfer. If not, control instead passes to block 350 to set BCOUNT to equal SECTORS.

Next, in block 352, routine 344 waits until Drive B is ready. When Drive B is ready, control passes to block 354 to perform the transfer of BCOUNT sectors between the on-board memory of Drive B and the host computer memory, whereby ADDRESSPOINT will be automatically updated by the data transfer. Next, in block 356 BCOUNT is subtracted from BSECTORS and SECTORS to reflect the completion of the data transfer of these sectors.

In block 358, the total number of sectors remaining to be transferred, SECTORS, is compared with zero. If there are no sectors remaining to be transferred, then the routine terminates. If, on the other hand, additional sectors remain to be transferred, control passes to block 360 to test whether the accesses on Drive A are split accesses (i.e., accessing sectors on more than one block) by comparing INITEND to zero. If INITEND is not zero, then ADDRESSPOINT must be reset with the value of APOINT in block 362. If INITEND is zero, then ADDRESSPOINT already points to the appropriate memory address.

Next, in block 364, the values for STARTCOUNT and ENDCOUNT are reset with their respective initial values INITSTART and INITEND. Then, control returns to block 320 shown in FIG. 5(a) to handle the next data transfer on Drive A. The remaining sectors are thus transferred irrespective of block boundaries in an alternating manner by alternating data transfers on Drives A and B using routine 310.

Returning to block 302, if Drive B is determined to be the starting drive, control passes to another transfer routine 370 to handle the transfer when Drive B is the starting drive. Routine 370 operates in much the same manner as routine 310 of FIGS. 5(a), 5(b) and 5(c), except that the split transfer operations using separate STARTCOUNT and ENDCOUNT variables, and the handling of the address pointer ADDRESSPOINT, are performed for Drive B instead of Drive A. Consequently, routine 370 will not be discussed separately herein.

Hardware Configuration

Figure 6:
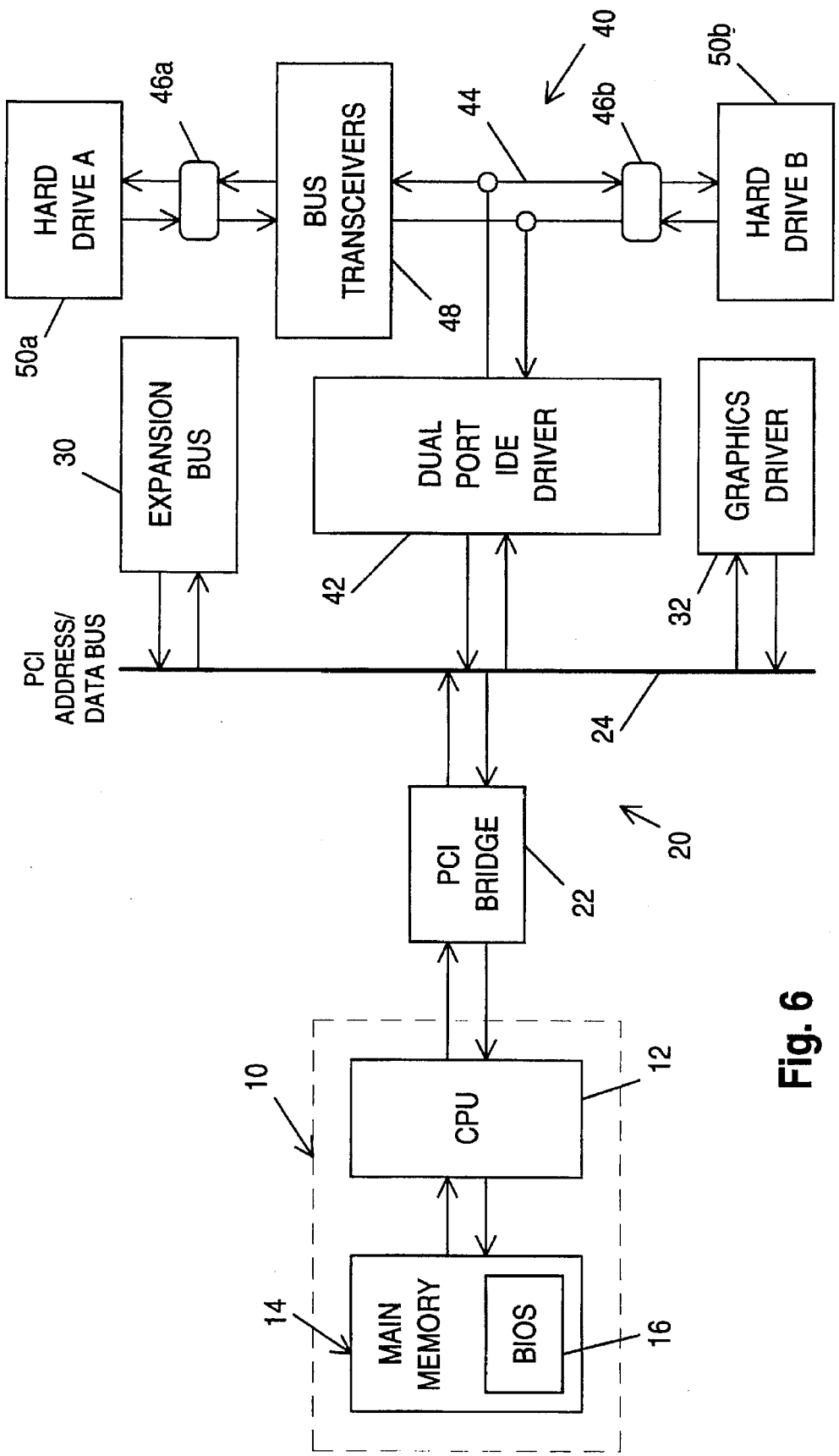
FIG. 6 is a functional block diagram of a preferred IDE-compatible multi-drive virtual mass storage device implemented in a PC-compatible computer system, suitable for executing the data management routine of FIG. 2.

FIG. 6 shows a preferred multi-drive virtual mass storage device 40 in a preferred environment of use, for implementing the preferred virtual device operating routine 100. Virtual device 40 is preferably implemented in a PC-compatible computer system, such as the type based upon the Intel family of microprocessors.

A main processing system 10 of the computer system includes a CPU 12 which is preferably an i486 or Pentium microprocessor manufactured by Intel. Processing system 10 also includes a main memory 14 which provides programming work space and much of the low level operating system routines. In particular, a BIOS 16 contains many of the low level mass storage device command routines for performing basic input/output functions between main processing system 10 and various peripheral components.

For virtual mass storage device 40, it is preferable to implement the basic input/output routines for the device in BIOS 16. This enables the primary operating system, such as MS-DOS or Windows, to handle input and output with virtual device 40 in the same manner as other conventional storage devices. Virtual device 40 may be allocated a separate logical drive assignment and be handled by the operating system like any other storage device.

Alternatively, virtual device 40 may be implemented at the operating system or software application level. In addition, it will be appreciated that virtual device 40 may be implemented in other personal computer systems, such as an Apple Macintosh or systems based upon the Power PC microprocessor. Moreover, virtual device 40 may also be implemented in other computer systems such as work stations, mini computers, network servers, etc., or other stand-alone or custom applications where transfer to and from a mass storage device is desired.

In the preferred embodiment, virtual device 40 is implemented using conventional IDE hardware for interfacing with main processing system 10. In particular, an IDE bus 44 is preferably driven by an IDE interface circuit 42 which is interfaced to main processing system 10 through a PCI system 20. PCI system 20 includes a multiplexed address/data bus 24 which is interfaced with the main processing system through PCI bridge circuit 22 that is generally known in the art. The PCI bus is generally used to interface various components with main processing system 10. For example, peripheral components such as the standard PC expansion bus 30 or a graphics/video driver 32, may also be interfaced through PCI bus 24.

IDE interface circuit or driver 42 is preferably a dual port device for interfacing IDE bus 44 with PCI bus 24. A pair of physical mass storage devices, such as hard drive 50a and hard drive 50b (designated "drive a" and "drive b") are coupled to bus 44 through 40 pin cables interconnected to the bus through connectors 46a and 46b.

Drives 50a and 50b are preferably IDE compatible drives with on-board controllers, such as ST5660A hard drives manufactured by Seagate. Drives suitable for use with the invention may have various storage capacities, currently up to about 32 Gigabytes, and may implement on-board memories (e.g., buffers and/or cache memories) currently up to 2048 sectors (1 MByte) of information, most typically 16 sectors (8 KBytes) or multiples thereof.

Hard drives 50a and 50b are preferably identical drives to facilitate processing. However, it will be appreciated that drives with different storage capacities, data transfer rates, sector or track capacities, etc., may also be used. Furthermore, while two physical hard drives are shown in FIG. 6, it will be appreciated that additional drives on additional ports may also be used to further increase the sustainable data transfer rates of virtual device 40.

IDE driver 42 is preferably an RZ1001 PCI to IDE interface circuit manufactured by Zeos International. Alternatively, IDE driver 42 may be any industry standard IDE port interface circuit having two or more IDE ports. The RZ1001 chip includes programmable command pulse widths and cycle timing, posted write buffers, and intelligent read-ahead. Moreover, this chip is fully compatible with IDE standard software and commands without any special software or drivers. This chip also includes a 32 bit accelerated mode which provides data transfer rates up to 19 MByte/s for shorter transfers. Moreover, the chip may control up to 4 drives on two separate IDE ports.

In the preferred embodiment, hard drives 50a and 50b are set up on individual ports to allow for separate addressing of each physical device. One or more data bus transceivers 48 may also be used to isolate the IDE drives and cables from IDE bus 44 and driver 42. For example, a series of 74LS245 chips manufactured by Texas Instruments may be used to isolate the drives from the bus.

It will be appreciated that other physical mass storage devices may be used, particularly in those instances where the sustainable data transfer rates of the devices are slower than the maximum transfer rates possible with a particular computer system and external interface therefor. Examples include SCSI-compatible hard drives, other hard drives, floppy drives, MO drives, flash memories, CD-ROMS, read-only or writable optical drives, tape backup devices, external non-volatile memories, etc., as well as other storage technologies that may be developed in the future. Therefore, the use of the IDE-compatible drive and processing hardware is provided merely for the purposes of illustration.

It will also be appreciated that information exchange and command protocols for the PCI and IDE standards is generally known in the art. In particular, the standards include dedicated registers and command structures for implementing data transfer and control of peripheral devices. In addition, it will be appreciated that the electrical interconnections and associated support circuitry (e.g., power supplies, data buffers, clocking circuits, etc.) between these different devices and systems are within the skill of the ordinary artisan.

Software Configuration

As discussed above, the preferred routines for virtual device 40 are stored in BIOS 16 in the host computer system. Consequently, the control and data transfer operations performed by the virtual device will preferably be invisible to the particular operating system implemented on the host computer.

For example, MS-DOS and Windows operating systems typically handle all of the file management tasks for performing data transfers on mass storage devices. Files are mapped to specific ranges of sectors on a storage device, and the data transfer of the range of sectors for a file or other data transfer is performed through standardized BIOS routines adapted for controlling conventional storage devices.

A host computer operating system such as MS-DOS or Windows typically controls the operation of mass storage devices through several BIOS routines. For example, hard disk drives may be controlled via BIOS interrupt INT 13H. The preferred virtual mass storage device is preferably implemented through modified INT 13H BIOS routines, such as by modifying a standard IDE-compatible BIOS, e.g., the 4.04 Version BIOS available from Phoenix Technologies Ltd.

The preferred virtual device is addressed via logical block addressing, such that logical sectors may be addressed independent of the physical geometries of the physical devices used in the virtual device. The preferred device reports to the operating system a value for the total number of sectors available which is equal to the sum of physical sectors available on both physical devices. Thus, the preferred virtual device appears the same as any other mass storage device to the operating system.

Preferably, the INT 13H BIOS routines which are modified for the operation of the preferred virtual device include at least Function 02h (Read Sectors), Function 03h (Write Sectors), Function 04h (Verify Sectors), Function 05h (Format Track or Cylinder), Function 08h (Determine Drive Parameters), Function 10h (Test Drive Ready), Function 11h (Calibrate Drive) and Function 13h (Drive Diagnostics). Other functions may also be modified to incorporate various features of the preferred virtual mass storage device.

A short summary of the necessary modifications for each of the above INT 13H routines will be provided. However, it will be appreciated that, given the disclosure of the configuration and operation of the preferred mass storage device, the particular code modifications required for controlling the preferred virtual device will be within the province of an artisan of ordinary skill in the art.

Function 02h—Read Sectors; Function 03h—Write Sectors: Both of these routines are preferably modified to execute the data manager routines as discussed above with reference to FIGS. 2, 3(a), 3(b), 3(c) and 4.

Function 04h–Verify Sectors: This routine is preferably modified to calculate the physical sectors on each drive which correspond to the range of logical sectors desired to be verified, e.g., by executing routines 200 and 260 of FIGS. 3(a), 3(b), 3(c) and 4. Then, appropriate commands may be sent to the corresponding physical devices to retrieve the desired range of physical sectors and perform a standard verification operation.

Function 05h—Format Track or Cylinder: This routine is preferably modified to calculate the physical sectors on each drive which correspond to a preferred range of logical sectors to be formatted, and then send appropriate format commands to the physical devices to perform the formatting of the corresponding physical sectors. Routines 200 and 260 of FIGS. 3(a), 3(b), 3(c) and 4 may be executed to perform the logical to physical sector mapping for each physical device.

Function 08h—Determine Drive Parameters: This routine is preferably modified to return a total number of sectors value which represents the sum of the number of sectors on all physical devices in the preferred virtual mass storage device. For two identical physical devices, the returned value would be two times the number of sectors on each physical drive.

Function 10h—Test Drive Ready: This routine is preferably modified to independently test the ready condition of each physical device. The routine returns a ready condition when all physical devices are ready.

Function 11h—Calibrate Drive: This routine is preferably modified to send appropriate commands to each physical device to move the read/write heads of the devices to their respective first tracks.

Function 13h—Drive Diagnostics: This routine is preferably modified to independently check each physical device and return an appropriate error status should any of the physical devices indicate an error condition.

Alternate Embodiments

Various modifications may be made to the preferred embodiments consistent with the invention. For example, FIG. 7 shows an alternate IDE driver 60 which may be used instead of IDE driver 42 shown in FIG. 6. Driver 60 operates in a similar manner to driver 42 in that it handles the PCI to IDE interface (in block 62) and handles IDE transfer and control commands for IDE-compatible drives using a PCI bus slave block 66. However, driver 60 includes different data transfer circuitry which implements a PCI bus master 65 for providing direct memory access (DMA) between the host computer memory and the physical devices across the PCI bus. In addition, driver 60 includes a pair of first-in/first-out (FIFO) registers 72 and 74 which enables data transfer to be performed with multiple physical devices at the same time.

Driver 60 includes a PCI interface block 62 for connecting with the PCI bus through lines 61. Data lines 70, and control lines 63 and 64 are interfaced with the PCI bus through this block.

A bus slave 66 is connected to PCI interface block 62 through control lines 64. Bus slave 66 handles IDE commands received across the PCI bus and controls Drives A and B accordingly through control lines 69. Bus slave 66 also controls a bus master 65 through control lines 67 and 68 which perform handshaking therebetween. Bus slave 66 essentially enables the host computer to perform programmed input/output (PIO) to control Drives A and B, and will typically control driver 60 except in a data transfer mode, where a bus master 65 takes over to handle information exchange across the PCI bus.

Bus master 65 is connected to the PCI interface block through control lines 63. Bus master 65 drives FIFO 72 through lines 91 and 92, and drives FIFO 74 through lines 93 and 94. Lines 91–94 provide handshaking to coordinate control over FIFOs 72 and 74. Bus master also includes lines 81–84 for providing direct memory access with Drives A and B. Lines 82 and 84 provide DRQ (DMA request) signals sent from Drives A and B, respectively. Lines 81 and 83 provide DMAACK (DMA acknowledge) signals returned by bus master 65 to Drives A and B, respectively. DRQ and DMAACK signals are components of the IDE protocol, and are provided as separate signals on IDE-compatible drives to enable DMA transfers using the drives.

FIFOs 72 and 74 provide data buffering for Drives A and B. FIFO 72 is connected to the data bus of Drive A through DATA0 lines 73, and FIFO 74 is connected to the data bus of Drive B through DATA1 lines 75.

Thus, driver 60 is connected to Drive A through DATA0 lines 73, control lines 69, DMAACK line 81 and DRQ line 82, and connected to Drive B through DATA1 lines 75, control lines 69, DMAACK1 line 81 and DRQ1 line 83.

In operation, driver 60 handles IDE commands and requests in a conventional manner using bus slave 66 to coordinate programmed I/O with the host computer. During data transfer operations, however, bus master 65 takes control and handles the data transfer between the host computer memory (across the PCI bus) and Drives A and B. In particular, through lines 81–84, bus master 65 is capable of coordinating the simultaneous transfer of information between Drive A and FIFO 72 and between Drive B and FIFO 74, according to convention IDE transfer operations. Further, bus master 65 is capable of generating appropriate addresses and alternately bursting blocks of data between the FIFOs and the PCI bus at an extremely fast rate, typically at the data transfer rate of the PCI bus, which is typically about 133 MByte/s. FIFOs 72 and 74 may be any size, preferably each less than or equal to the size of the logical and physical blocks, and more preferably 32 bytes in size, so that bus master 65 alternately transfers blocks of 32 bytes when data transfers are being performed concurrently with both drives. A FIFO size of 32 is preferred for use with many commercially available chipsets, which often work most efficiently for this size of burst transfers on a PCI bus without unduly monopolizing the bus.

DMA data transfer over multiple data channels is generally known in the art. Moreover, IDE-compatible command, control, and data transfer protocols are also understood in the art. Therefore, a hardware and/or software implementation of driver 60 would generally be within the province of an ordinary skilled artisan. Furthermore, different DMA and/or FIFO implementations may be envisioned, e.g., for non-IDE applications.

Other changes or modifications may be made to the preferred embodiments without departing from the spirit and scope of the invention. Thus, the invention lies in the claims hereafter appended.

What is claimed is:

1. A virtual mass storage device for use with a computer system, for storing data in a format including a plurality of logical sectors arranged in logical blocks, each logical block representing an integral number of logical sectors, the virtual device comprising:

(a) first and second physical mass storage devices, each for storing data in a format including a plurality of physical sectors, wherein the physical sectors are arranged in physical blocks, each physical block representing an integral number of physical sectors;

(b) first and second intelligent drive controllers for respectively handling data transfers with the first and second physical mass storage devices, each intelligent drive controller having an on-board memory, wherein the first and second drive controllers operate independent of one another; and (c) control means for transferring data between the computer system and the first and second physical mass storage devices in response to a transfer request for a group of logical sectors, the control means including:

(i) determining means for determining respective first and second groups of physical sectors on the first and second physical mass storage devices that correspond to the group of logical sectors;

(ii) command means for sending commands to the first and second intelligent drive controllers to respectively transfer data related to the first and second groups of physical sectors between the on-board memories and the physical mass storage devices; and (iii) first second transferring means for alternately transferring data related to the first and second groups of physical sectors between the computer system and the on-board memories of the first and second intelligent drive controllers, respectively, wherein the first and second transferring means alternate transferring segments of data equal in size to the physical blocks irrespective of block boundaries.

2. The virtual device of claim 1, wherein each block represents sixteen sectors of data.

3. The virtual device of claim 2, wherein each sector represents 512 byte of data.

4. The virtual device of claim 1, wherein the determining means assigns logical sectors in even-numbered blocks to physical sectors on the first physical mass storage device and logical sectors in odd-numbered blocks to physical sectors on the second physical mass storage device.

5. The virtual device of claim 1, wherein the command and determining means are implemented in the basic input/output routines of the computer system.

6. The virtual device of claim 1, wherein the command means commands the first and second physical mass storage devices to perform read or write functions responsive to the transfer request from the computer system.

7. The virtual device of claim 1, further comprising a bus interface circuit for interfacing between the computer system and the first and second physical mass storage devices, and wherein the first and second intelligent drive controllers are respectively integrated into the first and second physical mass storage devices; whereby each physical mass storage device is an intelligent device.

8. The virtual device of claim 7, wherein the bus interface circuit comprises a dual-port IDE-compatible interface circuit for interfacing to a PC-compatible computer system, and wherein each physical mass storage device is interconnected to a port on the IDE-compatible interface circuit.

9. The virtual device of claim 7, wherein the bus interface circuit further comprises a direct memory access circuit for transferring data directly between the computer system and the on-board memories of the intelligent drive controllers on the first and second physical mass storage devices.

10. The virtual device of claim 7, wherein the bus interface circuit further comprises first and second first-in/first-out registers respectively interconnected with the on-board memories of the intelligent drive controllers on the first and second physical mass storage devices.

11. The virtual device of claim 1, wherein the determining means includes means for calculating starting and total numbers of physical sectors for each physical mass storage device.

12. The virtual device of claim 1, wherein the physical mass storage devices are identically configured.

13. The virtual device of claim 1, wherein the physical mass storage devices are IDE-compatible hard disk drives.

14. The virtual device of claim 1, wherein the physical mass storage devices are SCSI-compatible hard disk drives.

15. The virtual device of claim 1, wherein the physical mass storage devices are accessed via logical block addressing.

16. The virtual device of claim 1, wherein the first and second transferring means maintain separate address pointers for the computer system such that data transfers not aligned with block boundaries occur in non-sequential logical blocks.

17. An apparatus for handling data transfers between a computer system and a plurality of physical mass storage devices, each physical mass storage device having a physical address space arranged into a format accessed via a plurality of physical addresses, the virtual device comprising a data manager for handling data transfers with the physical mass storage devices, wherein the data manager includes a virtual address space arranged into a format accessed via a plurality of logical addresses, wherein each logical address corresponds to a physical address on one of the physical mass storage devices; whereby, in response to a transfer request for data at at least one logical address, the data manager handles the data transfer with the physical address on the appropriate physical mass storage device which corresponds to the logical address; wherein the plurality of physical addresses on each physical mass storage device are arranged into a plurality of physical blocks, each of which includes a plurality of physical sectors, wherein the plurality of logical addresses are arranged into a plurality of logical blocks, each of which includes a plurality of logical sectors, and wherein the data manager includes:

(a) assigning means, responsive to a transfer request from the computer system that specifies at least one logical sector to transfer, for assigning the logical sector to a corresponding physical sector on one of the physical mass storage devices; and (b) transferring means for transferring data related to the corresponding physical sector between the computer system and the physical mass storage device on which the corresponding physical sector is located, the transferring means including a separate address pointer for each physical mass storage device such that data transfers not aligned with block boundaries occur in non-sequential logical blocks.

18. A computer system including the apparatus of claim 17.

19. The apparatus of claim 17, wherein the plurality of physical mass storage devices comprises first and second physical mass storage devices, wherein the assigning means is responsive to a transfer request that specifies a group of logical sectors to transfer, wherein the assigning means determines respective first and second groups of physical sectors on the first and second physical mass storage devices that correspond to the group of logical sectors to transfer, and wherein the transferring means alternately transfers (1) segments from the first group of physical sectors between the computer system and the first physical mass storage device, and (2) segments from the second group of physical sectors between the computer system and the second physical mass storage device.

20. The apparatus of claim 19, wherein the logical sectors and the physical sectors are respectively arranged in logical and physical blocks, and wherein the determining means assigns logical sectors in even-numbered blocks to physical sectors on the first physical mass storage device and logical sectors in odd-numbered blocks to physical sectors on the second physical mass storage device.

21. The apparatus of claim 20, further comprising command means for commanding the first and second physical mass storage devices to respectively transfer data related to the first and second groups of physical sectors.

22. The apparatus of claim 21, wherein each physical mass storage device is an intelligent device of the type having an on-board memory and a physical media; whereby, in response to a command from the command means, each physical mass storage device transfers data between its on-board memory and physical media independent of the other physical mass storage device.

23. The apparatus of claim 22, wherein the computer system includes a bus interface circuit for interfacing with the first and second physical mass storage devices, wherein the bus interface circuit comprises a dual-port IDE-compatible interface circuit for interfacing to a PC-compatible computer system, and wherein the physical mass storage devices are identical IDE-compatible hard disk drives interconnected to data ports on the IDE-compatible interface circuit.

24. The apparatus of claim 23, wherein the transferring means further comprises a direct memory access circuit for transferring data directly between the computer system and the on-board memories of the first and second physical mass storage devices.

25. The apparatus of claim 23, wherein the transferring means further comprises first and second first-in/first-out registers respectively interconnected with the on-board memories of the first and second physical mass storage devices.

26. A method of transferring data between a computer system and first and second physical mass storage devices of the type in which data is stored in a format including a plurality of physical sectors, the method responsive to a transfer request for a group of logical sectors, wherein the logical sectors and the physical sectors are respectively arranged in logical and physical blocks, the method comprising the steps of:

(a) determining respective first and second groups of physical sectors on the first and second physical mass storage devices that correspond to the group of logical sectors; and (b) transferring data related to the corresponding physical sector between the computer system and the physical mass storage device on which the corresponding physical sector is located, wherein the transferring step includes the step of alternately transferring (1) segments of data from the first group of physical sectors between the computer system and the first physical mass storage device, and (2) segments of data from the second group of physical sectors between the computer system and the second physical mass storage device, and wherein the transferring step alternates transferring segments of data equal in size to the physical blocks irrespective of block boundaries.

27. The method of claim 26, wherein the determining step assigns logical sectors in even-numbered blocks to physical sectors on the first physical mass storage device and logical sectors in odd-numbered blocks to physical sectors on the second physical mass storage device.

28. The method of claim 27, wherein each block represents sixteen sectors of data, and wherein each sector represents 512 bytes of data.

29. The method of claim 27, further comprising the step of commanding the first and second physical mass storage devices to respectively transfer data related to the first and second groups of physical sectors.

30. The method of claim 29, further comprising the step of calculating starting and total numbers of physical sectors for each physical mass storage device, and wherein the commanding step passes the starting and total numbers of physical sectors to each physical mass storage device.

31. The method of claim 30, wherein the physical mass storage devices are accessed via logical block addressing.

32. The method of claim 29, wherein each physical mass storage device is an intelligent device of the type having an on-board memory, and wherein the transferring step transfers data related to physical sectors between the computer system and the on-board memories of the physical mass storage devices.

33. The method of claim 32, wherein the computer system is of the type including a bus interface circuit for interfacing with the first and second physical mass storage devices, wherein the bus interface circuit comprises a dual-port IDE-compatible interface circuit for interfacing to a PC-compatible computer system, and wherein the physical mass storage devices are identical IDE-compatible hard disk drives interconnected to data ports on the IDE-compatible interface circuit.

34. The method of claim 33, wherein the transferring step is performed using a direct memory access circuit to transfer data directly between the computer system and the on-board memories of the first and second physical mass storage devices.

35. The method of claim 33, wherein the transferring step is performed using first-in/first-out registers interconnected with each of the on-board memories of the first and second physical mass storage devices.

36. The method of claim 26, wherein the method is implemented in the basic input/output routine of a PC-compatible computer system.

37. A method of transferring data between a computer system and first and second physical mass storage devices of the type on which data is stored in a format including a plurality of sectors, the method responsive to a transfer request for a group of logical sectors, wherein the logical sectors and the physical sectors are respectively arranged in logical and physical blocks, the method comprising the steps of:

(a) determining respective first and second groups of physical sectors on the first and second physical mass storage devices that correspond to the group of logical sectors, wherein the determining step assigns logical sectors in even-numbered blocks to physical sectors on the first physical mass storage device and logical sectors in odd-numbered blocks to physical sectors on the second physical mass storage device; and (b) alternately transferring (1) segments of data from the first group of physical sectors between the computer system and the first physical mass storage device, and (2) segments of data from the second group of physical sectors between the computer system and the second physical mass storage device, wherein the transferring step transfers data such that data transfers not aligned with block boundaries occur in non-sequential logical blocks.

38. A method of transferring data between a computer system and first and second physical mass storage devices of the type in which data is stored in a format including a plurality of sectors, the method responsive to a transfer request for a group of logical sectors, wherein the logical sectors and the physical sectors are respectively arranged in logical and physical blocks, the method comprising the steps of:

(a) determining respective first and second groups of physical sectors on the first and second physical mass storage devices that correspond to the group of logical sectors, wherein the determining step assigns logical sectors in even-numbered blocks to physical sectors on the first physical mass storage device and logical sectors in odd-numbered blocks to physical sectors on the second physical mass storage device; and (b) alternately transferring (1) segments of data from the first group of physical sectors between the computer system and the first physical mass storage device, and (2) segments of data from the second group of physical sectors between the computer system and the second physical mass storage device, wherein the transferring step alternates transferring segments of data equal in size to the physical blocks irrespective of block boundaries; whereby each separate data transfer with a physical mass storage device may represent sectors from more than one block.

* * * * *